US007077477B1

(12) United States Patent
Syrowik et al.

(10) Patent No.: US 7,077,477 B1
(45) Date of Patent: Jul. 18, 2006

(54) TRANSLATING ARMREST

(75) Inventors: Glenn F Syrowik, Ortonville, MI (US); Ravi Hosalli, Troy, MI (US); Ronald J Kaip, Sterling Heights, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 11 days.

(21) Appl. No.: 11/021,905

(22) Filed: Dec. 22, 2004

(51) Int. Cl.
*A47C 7/54* (2006.01)
*B60N 2/46* (2006.01)

(52) U.S. Cl. .......................... 297/411.32; 297/411.25; 297/411.29; 297/411.3; 297/411.35; 297/411.37; 297/411.38

(58) Field of Classification Search ............ 297/411.32, 297/411.3, 411.35, 411.37, 411.38, 411.25, 297/411.29
See application file for complete search history.

(56) References Cited

U.S. PATENT DOCUMENTS

| | | | | |
|---|---|---|---|---|
| 3,116,093 A | * | 12/1963 | Bosack | 297/411.32 |
| 4,230,414 A | * | 10/1980 | Cheshire | 297/411.32 X |
| 4,435,011 A | * | 3/1984 | Hakamata | 297/411.38 X |
| 4,466,664 A | * | 8/1984 | Kondou | 297/411.32 X |
| 4,674,790 A | * | 6/1987 | Johnson | 297/411.38 X |
| 4,902,072 A | * | 2/1990 | Chancellor, Jr. | 297/411.32 |
| 5,275,465 A | * | 1/1994 | Gulliver et al. | 297/411.32 X |
| 5,320,415 A | * | 6/1994 | Krebs | 297/411.32 |
| 5,597,209 A | * | 1/1997 | Bart et al. | 297/411.38 |
| 5,702,157 A | * | 12/1997 | Hurite | 297/411.38 |
| 5,709,432 A | * | 1/1998 | Gryp | 297/411.32 |
| 5,733,010 A | * | 3/1998 | Lewis et al. | 297/411.32 |
| 5,769,496 A | * | 6/1998 | Gryp | 297/411.32 |
| 5,823,624 A | * | 10/1998 | Dahlbacka | 297/411.32 X |
| 6,257,668 B1 | * | 7/2001 | Chou et al. | 297/411.32 |
| 6,883,871 B1 | * | 4/2005 | Nae et al. | 297/411.32 |
| 6,916,068 B1 | * | 7/2005 | Kitamura et al. | 297/411.3 |
| 2003/0164638 A1 | * | 9/2003 | Funk et al. | 297/411.32 |
| 2004/0124687 A1 | * | 7/2004 | Nae et al. | 297/411.32 |

FOREIGN PATENT DOCUMENTS

| | | | | |
|---|---|---|---|---|
| DE | 3512953 A1 | * | 11/1986 | 297/411.32 |
| FR | 2696387 A1 | * | 4/1994 | 297/411.32 |
| JP | 57104423 A | * | 6/1982 | 297/411.32 |
| JP | 60131331 A | * | 7/1985 | 297/411.32 |
| JP | 04361707 A | * | 12/1992 | 297/411.32 |
| JP | 05023233 A | * | 2/1993 | 297/411.32 |

* cited by examiner

*Primary Examiner*—Rodney B. White
(74) *Attorney, Agent, or Firm*—Ralph E. Smith

(57) ABSTRACT

A seat assembly having a seat frame arranged to support a cushion, a rotatable armrest, a threaded receiver mounted to either the seat frame or the armrest, a translation shaft coupled with the other of the seat frame or the armrest which includes a thread disposed on the outside surface of the shaft arranged to matingly engage with the threaded receiver. Rotation of the armrest relative to the seat frame causes the armrest to translate toward or away from the seat frame as the threads of the translation shaft engage with the threaded receiver.

8 Claims, 3 Drawing Sheets

TRANSLATING ARMREST

TECHNICAL FIELD OF THE INVENTION

This invention relates generally to seats for motor vehicles and more specifically to a translating armrest.

BACKGROUND OF THE INVENTION

Many motor vehicles, particularly sport utility vehicles and minivans, are equipped with second and third row rear seats that can be moved from a seating configuration, in which passengers can sit in the seat, to a storage configuration in which the seat is folded downwardly to assume a horizontal orientation and thereby facilitate cargo stowage. Often, these stowable seats are narrower than fixed seats in order to fit within the storage compartment.

Typically, these second and third row seats have an armrest that is movable between an upward position and a downward position, pivoting about an axis. Armrests such as these are not movable in a lateral direction and may make the occupant of these seats uncomfortable.

What is needed is an armrest that overcomes these and other disadvantages.

SUMMARY OF THE INVENTION

One aspect of the present invention is a seat assembly comprising a seat frame arranged to support a cushion, a rotatable armrest, a threaded receiver mounted to either the seat frame or the armrest, a translation shaft coupled with the other of the seat frame or the armrest which includes a thread disposed on the outside surface of the shaft arranged to matingly engage with the threaded receiver. Rotation of the armrest relative to the seat frame causes the armrest to translate toward or away from the seat frame as the threads of the translation shaft engage with the threaded receiver.

Accordingly, it is an object of the present invention to provide a seat assembly of the type described above that can be moved between a storage position and an armrest position.

These and other features and advantages of the invention will become further apparent from the following detailed description of the presently preferred embodiments, read in conjunction with the accompanying drawings. The drawings are not drawn to scale. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
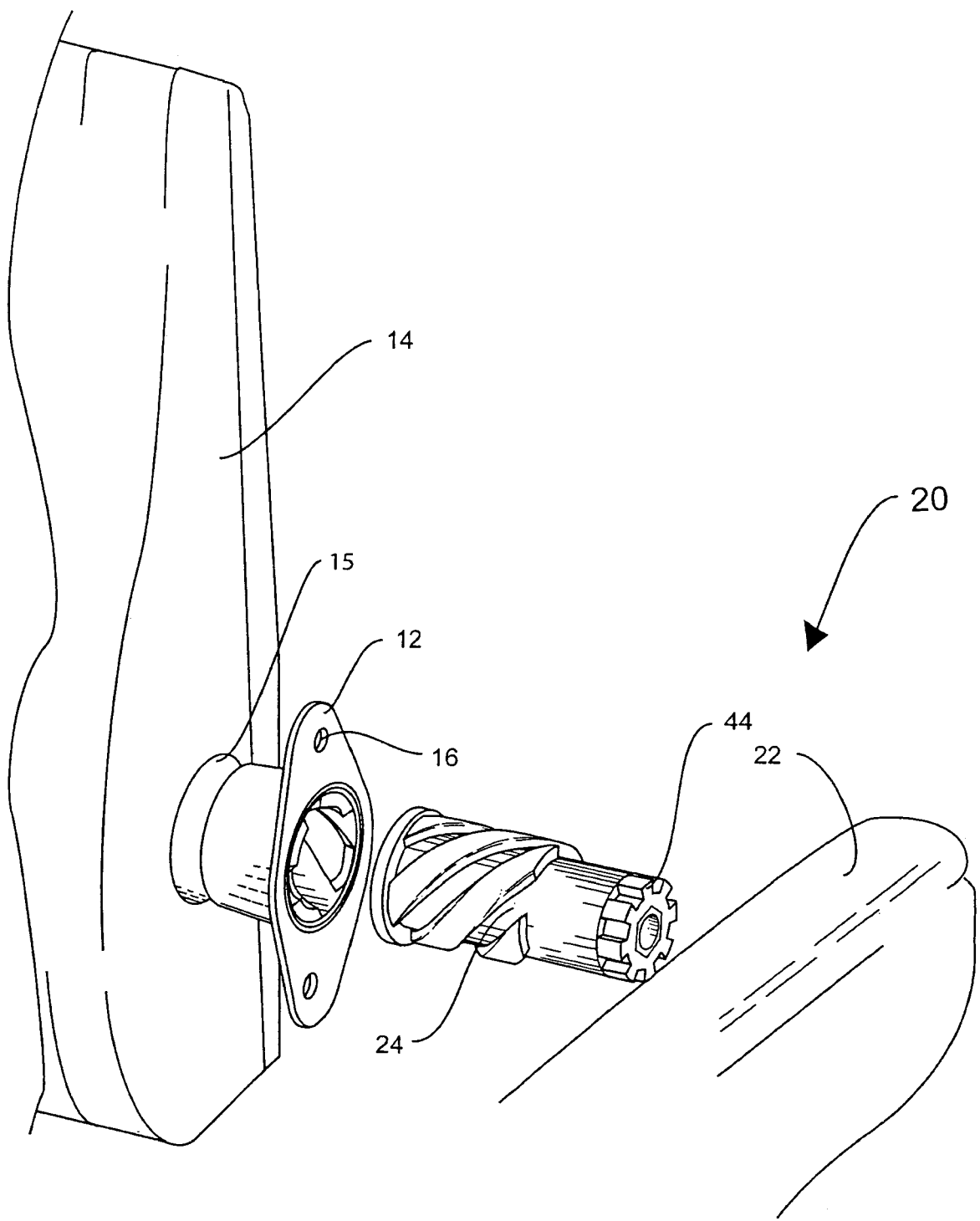
FIG. 1 is an exploded perspective view of an armrest assembly according to the present invention.
Figure 2:
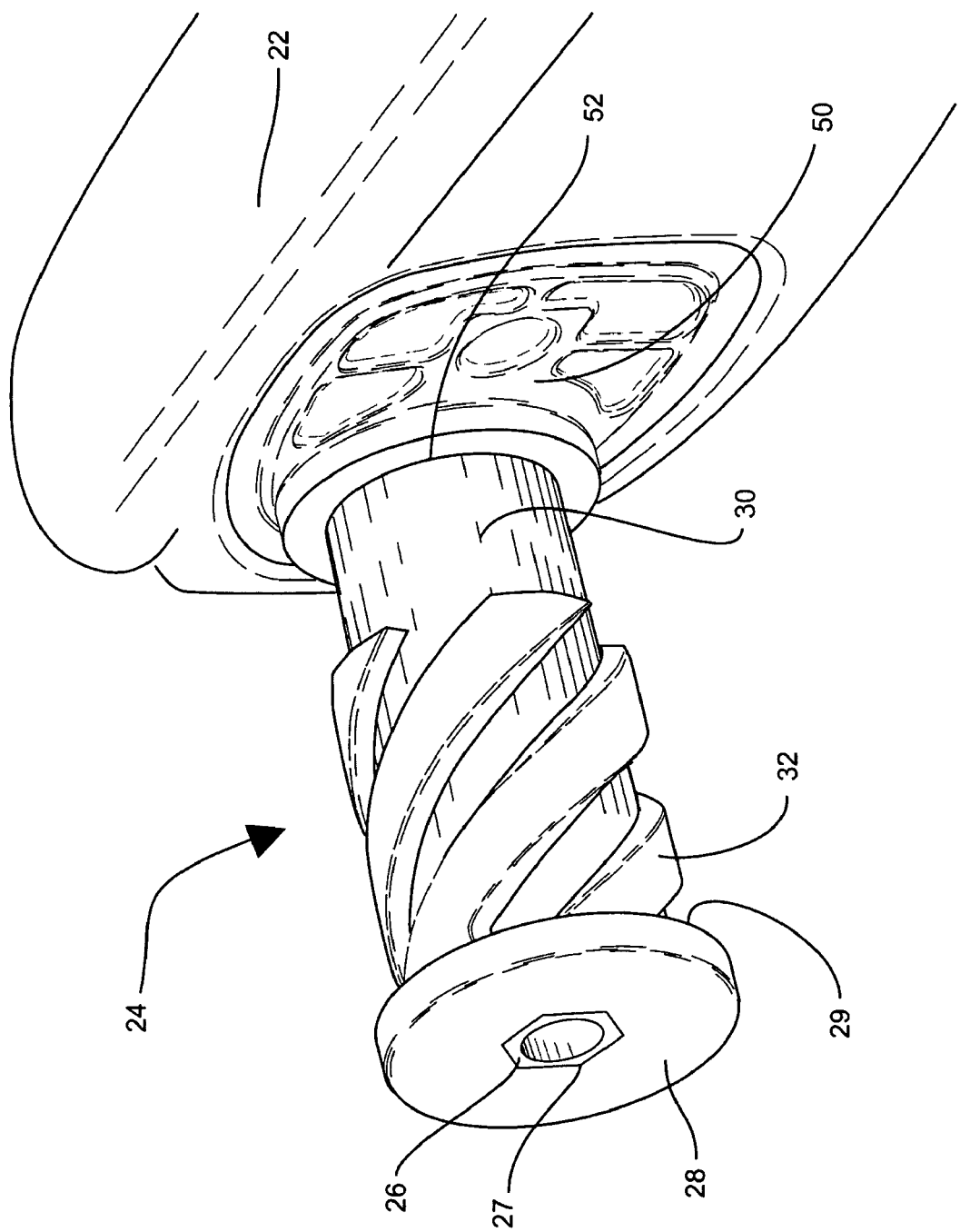
FIG. 2 is a detailed perspective view of a portion of the armrest assembly of FIG. 1.
Figure 3:
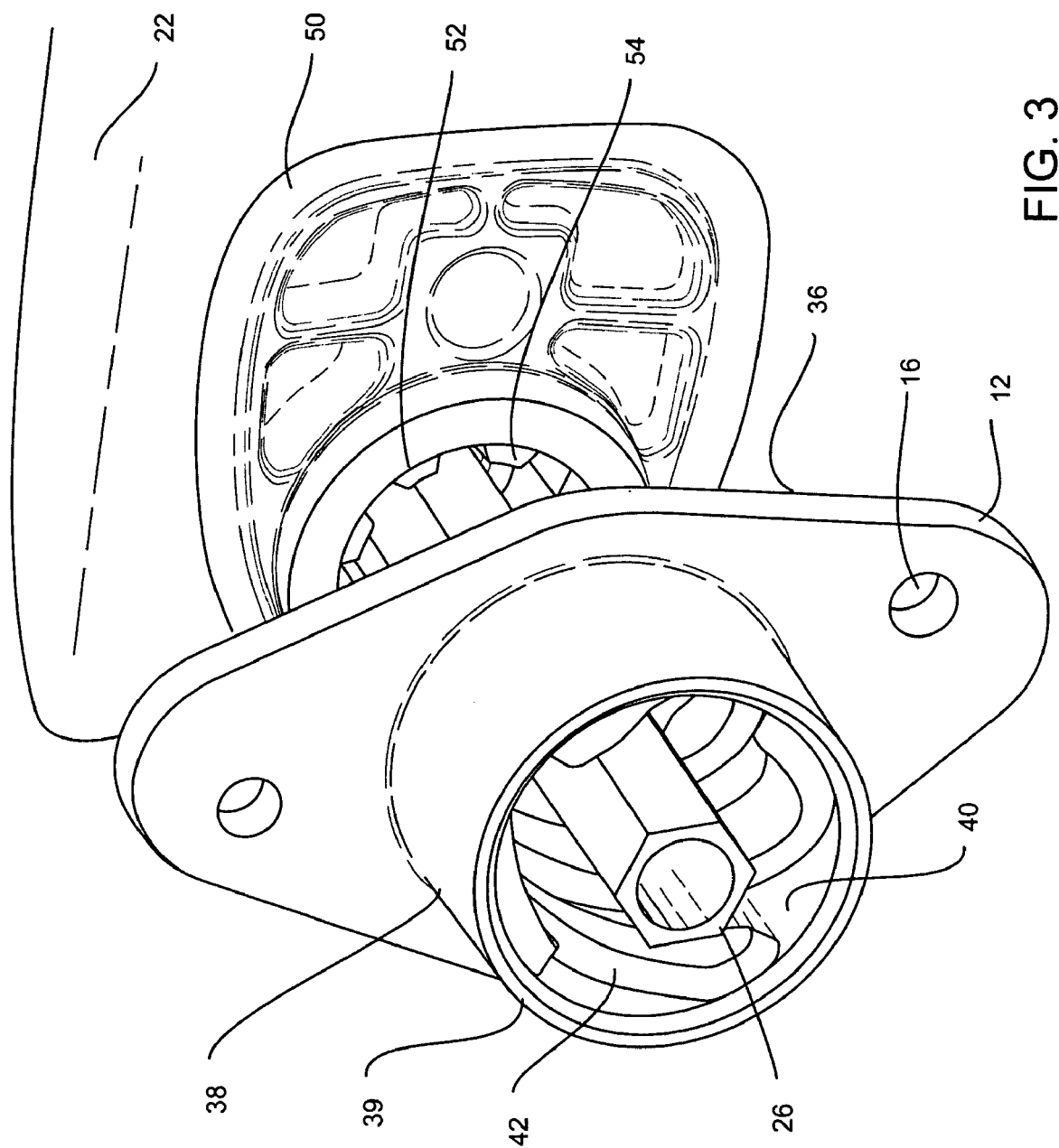
FIG. 3 is a detailed perspective view of another portion of the armrest assembly of FIG. 1.

FIGS. 1 to 3 show one embodiment 10 of a seat assembly according to the present invention for a motor vehicle. The seat assembly 10 includes a seat frame arranged to support a cushion 14 and an armrest assembly 20.

Seat frame 14 includes an opening 15 for receiving threaded shaft bracket 12. Referring to FIG. 3, threaded shaft bracket 12 includes a seat attachment portion 36 and sleeve portion 38. Threaded shaft bracket 12 may be composed of metal, polymer or combinations thereof. Seat attachment portion 36 extends radially from sleeve portion 38. Seat attachment portion 36 and sleeve portion 38 may be formed together as a single piece or, alternatively, fashioned separately and attached by any method known in the art, such as by welding. Threaded shaft bracket 12 may be fixedly attached to seat frame 14 by any fastening means known in the art such as, for example, threaded screws or bolts received in openings 16 and threaded openings (not shown) within seat frame 14. Sleeve portion 38 includes an inside surface 40 having a plurality of helical threads 42.

Armrest assembly 20 is comprised of an armrest 22, armrest bracket 50 and translation shaft 24. Armrest bracket 50 is attached to armrest 22 in any manner known in the art. In one embodiment, armrest bracket 50 is integrally formed or molded with armrest 22. Armrest bracket 50 includes a shaft receiving portion 52 having a plurality of inwardly projecting teeth 54. When assembled, the inwardly projecting teeth 54 correspond to and mate with a notched (toothed) end 44 of translation shaft 24 to prevent the rotation of armrest assembly 20 relative to the armrest 22.

Translation shaft 24 includes a radially extending stop 28 disposed at a first end. Stop 28 includes an inside surface 29 for abutting engagement with sleeve end 39. Inside surface 29 abuts sleeve end 39 when the armrest assembly is in the armrest position. Translation shaft 24 and sleeve portion 38 are complementarily threaded. Translation shaft 24 includes a plurality of helical threads 32 disposed upon a portion of an outside surface 30 of the translation shaft 24. Helical threads 32 are sized and positioned to engage threads 42 of threaded inside surface 40 of sleeve 38.

Translation shaft 24 further includes an axial bore 27 for receiving a shaft core 26. Bore 27 and shaft core 26 are complementarily shaped in a manner that prevents rotation of the translation shaft 24 about shaft core 26. In one embodiment, shaft core 26 has a hexagonal cross section. Those with skill in the art will recognize that other shapes may be used for shaft core 26 and bore 27 to prevent rotation of the translation shaft 24 about shaft core 26. Shaft core 26 is attached to arm rest 22. In one embodiment, shaft core 26 is attached to armrest bracket 50. In an alternative embodiment, shaft core 26 is integral to armrest bracket 50.

In operation, armrests 22 (only one is shown for clarity of the illustration) provided on either side of the seat frame 14 are rotatable generally upwardly and inwardly to assume stowed position. Armrests 22 are rotated generally downwardly and outwardly to assume an armrest position. In the exemplary embodiment, the seat frame 14 includes a seat bottom frame (not shown) and a seat back frame (not shown) arranged to releasably pivot between an upright position and a stowed position, as is generally understood to one of ordinary skill in the art. In accordance with the present inventions, as the seat back frame is released from an upright position and folded into a stowed position, the armrests 22 automatically rotate upward and laterally inward toward the seat back frame. In the exemplary embodiment, the armrests 22 rotate about 110 degrees between their armrest position and their stowed position, with the armrest 22 translating about 1 inch between the armrest position and the stowed position. Those with skill in the art will recognize that the length of translation may be increased or decreased depending on the result desired.

The present invention thus provides a seat assembly having an armrest assembly that moves between a storage position and an armrest position. While the embodiment of the invention disclosed herein is presently considered to be preferred, various changes and modifications can be made without departing from the spirit and scope of the invention. For example, the threads of the translation shaft 24 and the threaded receiver 12 can be reversed, so the armrest 22 is translated nearer the seat frame 14 in the armrest position and away from the seat frame 14 in the stowed position. In an alternative embodiment, the pitch of the threads of the translation shaft 24 and the threaded shaft bracket 12 can be varied and/or stops provided to define the distance of armrest rotation and translation. The scope of the invention is indicated in the appended claims, and all changes that come within the meaning and range of equivalents are intended to be embraced therein.

The invention claimed is:

1. A seat assembly comprising:
   a seat frame arranged to support a cushion;
   a rotatable armrest wherein the armrest comprises an armrest bracket and armrest frame arranged to support a cushion, said armrest bracket having an opening and attached to the armrest frame;
   said opening including a plurality of radially inwardly projecting teeth for engaging a notched end of the translation shaft;
   a threaded receiver mounted to one of said seat frame or said armrest;
   a translation shaft coupled with the other of said seat frame or said armrest, said translation shaft including a thread disposed upon an outside surface arranged to matingly engage with the threaded receiver;
   wherein rotation of the armrest relative to the seat frame causes the armrest to translate toward or away from the seat frame as the threads of the translation shaft engage with the threaded receiver.

2. The assembly of claim 1 wherein the armrest moves laterally inward toward the seat frame when the armrest is rotated upward and laterally outward from the seat frame when the armrest is rotated to a downward position.

3. The assembly of claim 1 wherein the threaded receiver is mounted to the seat frame and the translation shaft is coupled with the armrest.

4. The assembly of claim 1 wherein the seat frame comprises a seat back frame and a seat bottom frame and arranged to be releasably pivoted into an upright position and a folded position,
   wherein said armrest is arranged to rotate upward and laterally inward toward the seat back frame as the seat back frame is moved into a folded position.

5. The assembly of claim 1 wherein the threaded receiver includes helical threads.

6. The assembly of claim 1 wherein the translation shaft includes a plurality of threads disposed upon an outside surface.

7. The assembly of claim 1 wherein the translation shaft includes a core shaft disposed within a central bore, the core shaft attached to the armrest bracket,
   wherein the core shaft and the central bore have a complementary shape to prevent rotation of the shaft about the core shaft.

8. A seat assembly comprising:
   a seat frame arranged to support a cushion;
   a rotatable armrest, wherein rotation of the armrest relative to the seat frame causes the armrest to translate toward or away from the seat frame as the threads of the translation shaft engage with the threaded receiver;
   a threaded receiver mounted to one of said seat frame or said armrest;
   a translation shaft coupled with the other of said seat frame or said armrest, said translation shaft including a thread disposed upon an outside surface arranged to matingly engage with the threaded receiver wherein the translation shaft includes a core shaft disposed within a central bore, the core shaft attached to the armrest bracket;
   wherein the core shaft and the central bore have a complementary shape to prevent rotation of the shaft about the core shaft; and
   the translation shaft further comprises a radially extending stop disposed adjacent the plurality of threads, the stop having an inside surface for abutting an end of the sleeve portion of the seat bracket.

* * * * *